United States Patent [19]

Stowell et al.

[11] Patent Number: 5,490,616
[45] Date of Patent: Feb. 13, 1996

[54] TEAKETTLE

[75] Inventors: Davin B. Stowell, New York, N.Y.;
Mari H. Ando, Stamford, Conn.;
Vanessa D. Sica, New York, N.Y.

[73] Assignee: General Housewares Corp., Terre Haute, Ind.

[21] Appl. No.: 305,100

[22] Filed: Sep. 13, 1994

[51] Int. Cl.⁶ .................................................. B65D 83/00
[52] U.S. Cl. .............................. 222/472; 141/79; D7/322; 222/482
[58] Field of Search ...................... 222/39, 470, 472, 222/473, 475, 475.1, 482; 126/388; 239/288; 137/377; 141/79; D7/312, 319, 321, 322

[56] References Cited

U.S. PATENT DOCUMENTS

| | | | |
|---|---|---|---|
| D. 288,518 | 3/1987 | Lebowitz | D7/322 |
| D. 308,314 | 6/1990 | Ancona et al. | D7/322 |
| D. 308,810 | 6/1990 | Urich | D7/322 |
| D. 336,006 | 6/1993 | Lebowitz | D7/322 |
| D. 342,640 | 12/1993 | Lebowitz | D7/312 |
| D. 352,419 | 11/1994 | Lin | D7/322 |
| 425,400 | 4/1890 | Boles | 222/39 X |
| 1,576,811 | 3/1926 | Clark | 137/377 X |
| 1,658,645 | 2/1928 | McGee | 239/288 |
| 2,501,142 | 3/1950 | Reichart | 222/470 X |
| 2,638,253 | 5/1953 | Mueller | 222/472 |
| 3,848,563 | 11/1974 | Brown | 126/388 X |
| 4,155,349 | 5/1979 | Hudson | 126/388 X |
| 4,385,585 | 5/1983 | Lebowitz | 126/388 X |
| 4,735,191 | 4/1988 | Boursse et al. | 126/388 |
| 4,813,368 | 3/1989 | Hutter, III et al. | 126/388 X |
| 4,857,897 | 8/1989 | Chen | 126/388 X |
| 4,873,918 | 10/1989 | Goldman | 126/388 X |
| 5,135,128 | 8/1992 | Kuhn | 222/469 X |
| 5,171,952 | 12/1992 | Waligorski et al. | 126/388 X |

FOREIGN PATENT DOCUMENTS

| | | | |
|---|---|---|---|
| 152461 | 10/1920 | United Kingdom | 126/388 |
| 400709 | 11/1933 | United Kingdom | 126/388 |
| 607046 | 8/1948 | United Kingdom | 222/475 |

*Primary Examiner*—Andres Kashnikow
*Assistant Examiner*—Kenneth Bomberg
*Attorney, Agent, or Firm*—Emrich & Dithmar

[57] ABSTRACT

A kettle has a hollow body defining a reservoir chamber and having a convex upper portion with a rim defining a circular filling opening into the chamber. A spout projects from the upper portion and communicates with the chamber. A handle is fixed to the body and spans the filling opening, terminating in the forward end adjacent to the spout. A concave arcuate guard extends upwardly from the body around the entire perimeter of the opening, the guard being fixed to the forward end of the handle for protecting the user's hand from steam. A concave lid removably closes the opening and has an arcuate handle which follows the contour of the body dome shape when in its closed position. A hinged spout cover has an actuator extending through a slot in the guard for manual actuation by the user's finger.

20 Claims, 1 Drawing Sheet

U.S. Patent
Feb. 13, 1996
5,490,616
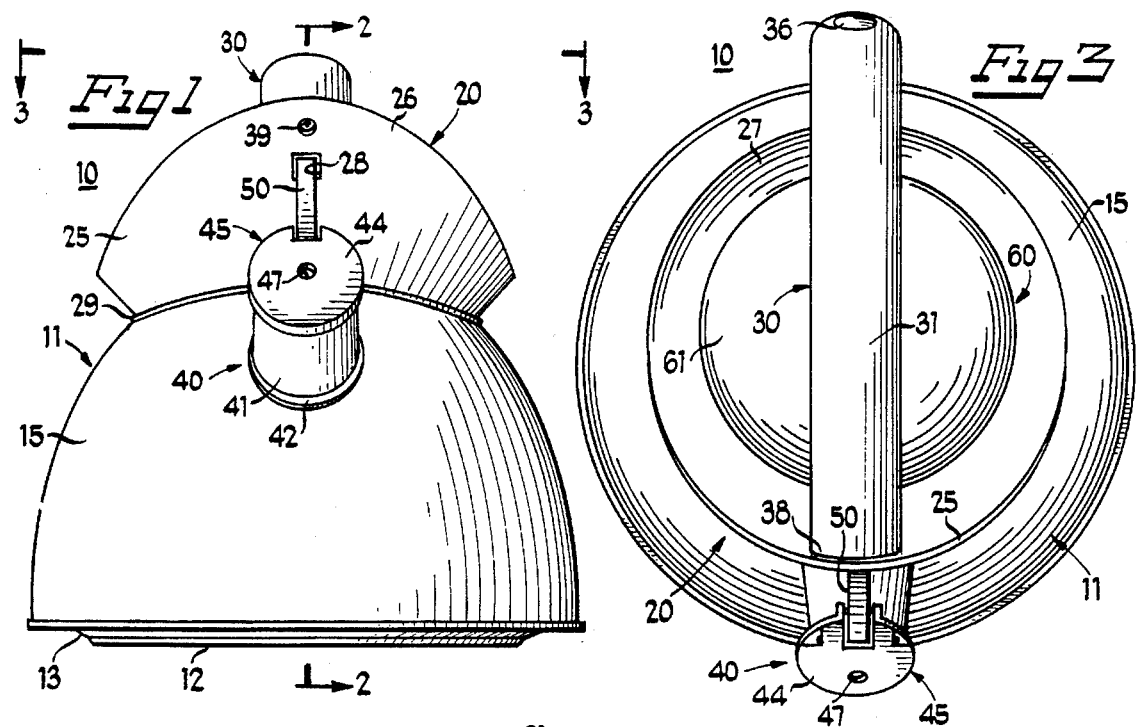
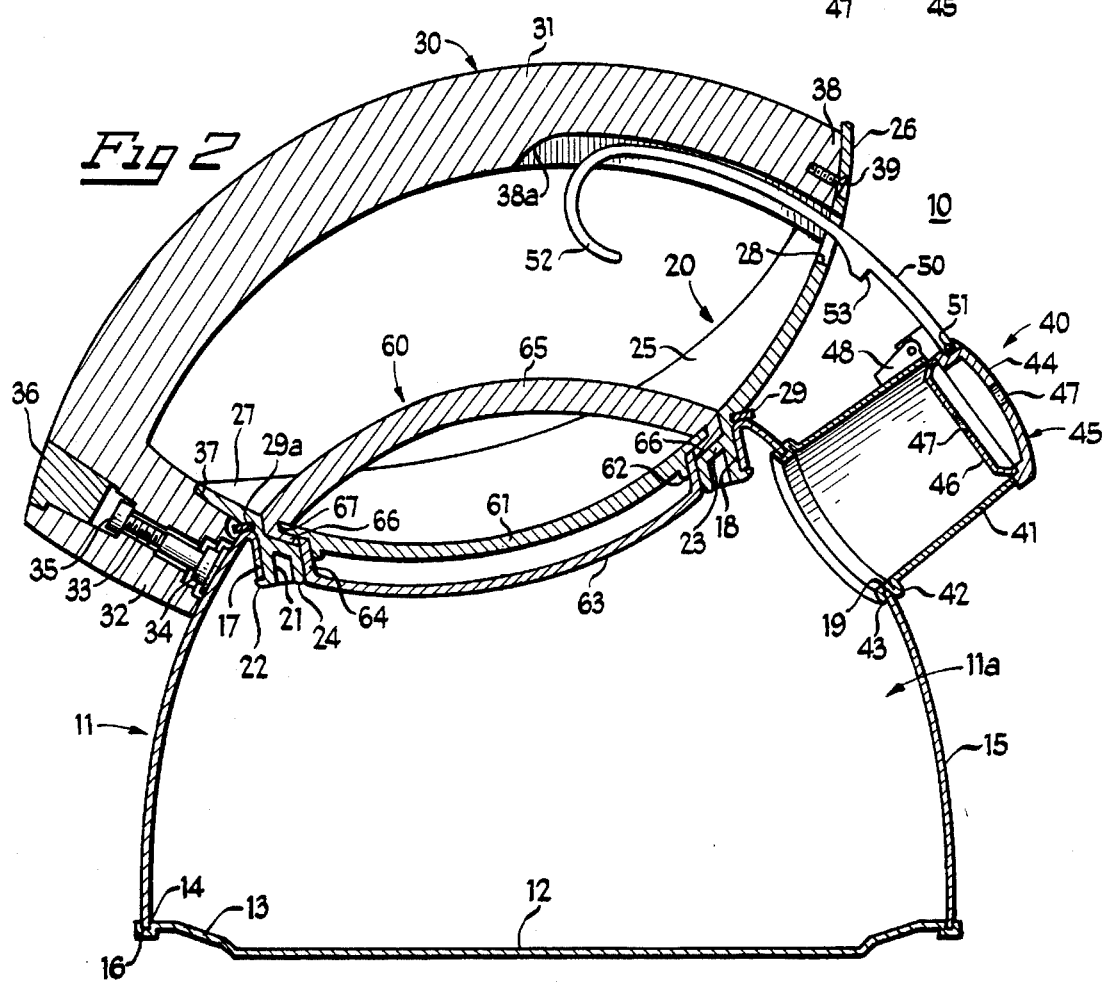

TEAKETTLE

BACKGROUND OF THE INVENTION

1. Field of the Invention

The present invention relates generally to kettles for boiling water, such as teakettles and, in particular, to teakettles having lidded refill openings in the top thereof beneath the handle.

2. Description of the Prior Art

Kettles are well-known cooking vessels for boiling water or the like. A common configuration for such kettles is a hollow body defining a reservoir chamber and having a spout and a bail-type handle, with a separate refill opening in the top of the body closable by a removable lid. Such a configuration is, for example, illustrated in U.S. Pat. No. 4,385,585. One drawback of such kettle configurations is that, during the pouring operation the handle and, therefore, the user's hand, is disposed generally above the spout, so that steam escaping upwardly from the spout can scald the user's hand. One attempted solution to this problem is provided by U.S. Pat. No. 5,135,128, in which the spout is provided with a cap coupled to a hinged bail handle. When the handle is lifted it pivots rearwardly, pulling the cap to an open position in which it also serves as a shield to deflect steam from the spout. But the cap is quite small, serving only a limited shielding function, and steam may still escape past the cap to reach the user's hand.

Another difficulty with lidded dome-shaped kettles, such as that disclosed in U.S. Pat. No. 5,135,128, is that the handle must extend well above the top of the dome to provide adequate clearance for removal of the lid, which is typically situated at the top of the dome. Thus, the grasping portion of the handle is a substantial distance above the center of gravity of the kettle, which tends to make pouring from the kettle more difficult.

SUMMARY OF THE INVENTION

It is a general object of the invention to provide an improved kettle which avoids the disadvantages of prior kettles while affording additional structural and operating advantages.

An important feature of the invention is the provision of a lidded dome-shaped kettle which minimizes the height of the handle above the top of the kettle.

Another feature of the invention is the provision of a kettle which effectively protects a user's hand from steam during the pouring operation.

Still another feature of the invention is the provision of a kettle of the type set forth which is of relatively simple and economical construction.

These and other features of the invention are attained by providing a kettle comprising: a hollow body defining a reservoir chamber and having a convex upper portion with a rim defining a filling opening into the chamber, a spout projecting from the upper portion and communicating with the chamber, a handle mounted on the body and extending there above and having a forward end disposed adjacent to the spout, a guard extending upwardly from the body between the spout and the forward end of the handle and shaped and dimensioned for protecting a user's hand from steam emanating from the spout during pouring, and a concave lid removably disposable in a closing position on the body closing the filling opening and defining a concave recess extending below the level of the rim.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a front elevational view of a teakettle constructed in accordance with and embodying the features of the present invention;

FIG. 2 is an enlarged view in vertical section taken along the line 2—2 in FIG. 1; and FIG. 3 is a top plan view of the teakettle of FIG. 1.

DESCRIPTION OF THE PREFERRED EMBODIMENT

Referring to FIGS. 1–3, there is illustrated a kettle 10 in the nature of a teakettle, and constructed in accordance and embodying the features of the present invention. The kettle 10 has a hollow body 11 defining therein a reservoir chamber 11a. The body 11 has a substantially flat, circular, bottom wall 12 provided around the periphery thereof with an upwardly inclined annular rim 13 which is, in turn, provided adjacent to its outer edge with a circular groove 14. The body 11 is also provided with a generally dome-shaped side wall 15 having a circular lower edge 16 disposed in the groove 14 and fixedly secured thereat to the bottom wall 12, as by brazing, welding or the like. The side wall 15 is provided at its upper end with an inturned cylindrical lip 17, which forms a filling opening 18 into the chamber 11a. Preferably, the opening 18 is displaced a slight distance to one side of the axis of the side wall 15, so that it has a high side and a low side. Also formed in the side wall 15 adjacent to the high side of the opening 18 is a circular spout opening 19.

It is a significant aspect of the invention that the kettle 11 is provided with a guard 20, which is generally part-spherical in shape with an eccentric circular aperture therethrough. More specifically, the guard has a depending annular mounting wall 21 which defines the eccentric aperture, the wall 21 being provided at its distal end with a laterally outwardly extending annular lip 22. Projecting radially inwardly from the annular mounting wall 21 is an inclined annular flange 23, provided at its distal edge with a depending annular skirt portion 24 substantially coaxial with the annular mounting wall 21. Extending upwardly and outwardly from the annular mounting wall 21 around its entire periphery is a part-spherical shield wall 25, which has a high front portion 26 and a low rear portion 27. A slot 28 is formed through the high front portion 26.

In assembly, the annular mounting wall 21 is slightly deflectable to permit it to be press-fitted through the filling opening 18 until the lip 22 snaps beneath the inner edge of the inturned lip 17 of the body side wall 15, as can best be seen in FIG. 2. An annular seal ring 29 may be seated in a complementary annular groove 29a in the outer surface of the annular mounting wall 21 so as to be seated against the body side wall 15 when the guard 20 is mounted in place. The guard 20 is oriented so that the high front portion 26 is disposed adjacent to the spout opening 19, with the height thereof tapering gradually downwardly toward the low rear portion 27.

The kettle 10 is also provided with a handle 30 having an arcuate bail portion 31 provided at one end thereof with a generally radially inwardly extending mounting leg 32 having a bore 33 therethrough with a series of counterbores therein. A nut fixture 34 is fixed to the outer surface of the body side wall 15 adjacent to the low rear portion 27 of the guard 20 and is received in one end of the bore 33. A suitable screw 35 is receivable through the other end of the bore 33 for threaded engagement in the nut fixture 34, that outer end of the bore 33 preferably being closed by a suitable plug 36 for aesthetic purposes. A shallow recess 37 may be formed in the mounting leg 32 to accommodate the low rear portion 27 of the guard 20. The handle 30 has a distal forward end 38 which is disposed against the inner surface of the high front portion 26 of the guard 20, being fixedly secured thereto, as by a screw 39. An elongated recess 38a is formed in the underside of the bail portion 31 and extends rearwardly from the forward end portion 38.

It is a significant aspect of the invention that the high front portion 26 of the guard 20 extends upwardly at least to the top of the forward end 38 of the handle 30 and extends laterally in opposite directions therefrom a substantial distance to provide a wide, high shield which completely closes the space between the spout opening 19 and the handle 30, so as to provide effective protection for a user's hand when it is grasping the handle 30.

The kettle 10 includes a spout assembly 40 having a tubular wall 41 disposed coaxially with the spout opening 19 and provided at its inner end with a pair of axially spaced apart annular mounting flanges 42 and 43, cooperating to define an annular groove which receives the peripheral edge of the spout opening 19 and may be fixedly secured thereto by suitable means. The distal end of the tubular wall 41 is provided with a cap 45, having an outer wall 44 and an inner wall 46 with coaxial central holes 47 therethrough to provide a steam escape to prevent pressure buildup in the chamber 11a, in a known manner. The cap 45 is hingedly mounted to the spout tubular wall 41 by a hinge assembly 48 for movement between a closed position, illustrated in the drawings, and an open position (not shown). An elongated actuator arm 50 has one end thereof hingedly connected to the cap 45 by a suitable hinge 51, the arm 50 extending through the slot 28 in the guard 20 and the recess 38a in the handle 30 and terminating in a depending finger hook 52. A latch tab 53 depends from the actuator arm 50 intermediate its ends.

In operation, it will be appreciated that when a user's hand is gripping the handle bail portion 31, the user's index finger may be hooked into the finger hook 52 for pulling the actuator arm 50 rearwardly, thereby pivoting the cap 45 to its open position. Preferably, the cap 45 is biased by gravity to its closed position. When the cap 45 is opened, the latch tab 53 may be hooked against the inner surface of the guard high front portion 26 at the lower edge of the slot 28 by a slight downward pressure on the finger hook 52 to latch the cap 45 open.

The kettle 10 is also provided with a lid 60 for closing the filling opening 18. More specifically, the lid 60 has a circular concave outer wall 61 provided with a depending cylindrical lip 62 a slight distance from its outer edge. The lid 60 also includes a circular inner wall 63 having an upstanding cylindrical peripheral wall 64 which telescopes over the lip 62. The lid 60 is also provided with an arcuate, bail-type handle 65, provided at its opposite end with inturned flanges 66 adapted to fit beneath the edge of the concave outer wall 61. Also formed in the handle 65 immediately above the flanges 66 are grooves 67 to accommodate the edge of the concave outer wall 61. The inner and outer walls 61 and 63 and the handle 65 may all be fixedly secured together by any suitable means.

In use, the parts are so dimensioned that the peripheral wall 64 of the inner wall 63 can be press fitted along the inner surface of the skirt portion 24 of the guard flange 23, thereby frictionally holding the lid 60 in place in a closed position, illustrated in the drawings, for closing the filling opening 18. Preferably, the handle 65 is so shaped that, when the lid 60 is disposed in its closing position, the handle 65 follows the contour of the domed side wall 15 of the body 11, and the concave outer wall 61 of the lid is shaped so that it follows the contour of the guard shield wall 25, as can best be seen in FIG. 2. Other curvatures are, however, possible and, in any event, there is sufficient clearance between the outer wall 61 and the handle 65 to accommodate insertion of a user's fingers to remove the lid 60.

Also, it will be appreciated that there is sufficient clearance between the handle bail portion 31 and the lid handle 65 to permit removal of the lid 60. It is a significant aspect of the invention that, because the lid 60 does not have a handle portion which extends outwardly beyond the dome contour of the domed side wall 15, the handle bail portion 31 may be disposed lower than would otherwise be the case, while still providing adequate clearance for removal of the lid 60. There results a configuration wherein the handle 30 is disposed relatively close to the center of gravity of the kettle 10, facilitating pouring therefrom.

In a constructional model of the invention, the body 11 and the spout tubular wall 41 are formed of a suitable metal, such as stainless steel, while the guard 20, the handle 30, the spout cap 45, the actuator arm 50 and the lid 60 may all be formed of suitable plastic materials.

From the foregoing, it can be seen that there has been provided a generally dome-shaped kettle with a relatively low profile handle, with a guard which effectively protects a user's hand from escaping steam during the pouring operation, and with a concave lid removable beneath the low profile handle.

I claim:

1. A kettle comprising: a hollow body defining a reservoir chamber and having a convex upper portion with a rim defining a filling opening into said chamber, a spout projecting from said upper portion and communicating with said chamber, a kettle handle mounted on said body and spanning said filling opening, and a concave lid removably disposable in a closing position on said body closing said filing opening and defining an arcuately concave recess extending below the level of said rim.

2. The kettle of claim 1, wherein said convex upper portion of said body is substantially dome-shaped.

3. The kettle of claim 1, wherein said filling opening is substantially circular in shape.

4. The kettle of claim 1, wherein said lid includes a lid handle projecting above said lid.

5. The kettle of claim 4, wherein said upper portion of said body is substantially dome-shaped, said lid handle being arcuate and substantially following the contour of the dome-shaped upper portion when said lid is disposed in its closing position.

6. The kettle of claim 4, and further comprising said kettle handle extends above said body a distance sufficient to accommodate movement of said lid to and from its closing position.

7. A kettle comprising: a hollow body defining a reservoir chamber, a spout projecting from said body and communicating with said chamber, a handle mounted on said body and extending thereabove and having a forward end disposed adjacent to said spout, and a guard extending upwardly from said body between said spout and the forward end of said handle and shaped and dimensioned for protecting a user's hand from steam emanating from said spout during pouring.

8. The kettle of claim 7, wherein said guard extends above said body at least as high as the forward end of said handle and extends laterally outwardly from each side of said handle a distance approximately the same as the height of said guard above said body.

9. The kettle of claim 7, wherein said guard has a concave arcuate shape as viewed from said handle.

10. The kettle of claim 7, wherein said hollow body has a rim defining a filling opening into said chamber.

11. The kettle of claim 10, wherein said guard extends upwardly from said body around the entire perimeter of said opening.

12. The kettle of claim 7, wherein said handle has a rear end fixed to said body, and further comprising means fixing the forward end of said handle to said guard.

13. The kettle of claim 7, and further comprising a cover hingedly mounted on said spout for pivotal movement between open and closed positions relative thereto, and an actuator coupled to said cover and manually operable for moving said cover between its open and closed positions.

14. A kettle comprising: a hollow body defining a reservoir chamber and having a convex upper portion with a rim defining a filling opening into said chamber, a spout projecting from said upper portion and communicating with said chamber, a kettle handle mounted on said body and extending thereabove and having a forward end disposed adjacent to said spout, a guard extending upwardly from said body between said spout and the forward end of said handle and shaped and dimensioned for protecting a user's hand from steam emanating from said spout during pouring, and a concave lid removably disposable in a closing position on said body closing said filling opening and defining a concave recess extending below the level of said rim.

15. The kettle of claim 14, wherein said opening is substantially circular in shape.

16. The kettle of claim 15, wherein said guard has a concave arcuate shape as viewed from said handle and extends upwardly from said body around the entire perimeter of said opening.

17. The kettle of claim 14, wherein upper portion of said body is substantially dome-shaped, and further comprising an arcuate lid handle projecting upwardly above said lid and substantially following the contour of said dome-shaped upper portion of said body when said lid is disposed in its closing position.

18. The kettle of claim 14, wherein said lid includes a peripheral wall portion adapted for press-fitted engagement with said rim when said lid is disposed in its closed position.

19. The kettle of claim 18, wherein said guard includes a depending flange portion defining a rim wall, said lid peripheral wall being press-fitted against said rim wall when said lid is disposed in its closed position.

20. The kettle of claim 14, wherein said body and said spout are formed of metal and said handle and said lid are formed of plastic material.

* * * * *